United States Patent [19]

Schmutz

[11] Patent Number: 5,555,090
[45] Date of Patent: Sep. 10, 1996

[54] SYSTEM FOR DIMENSIONING OBJECTS

[75] Inventor: Lawrence E. Schmutz, Watertown, Mass.

[73] Assignee: Adaptive Optics Associates, Cambridge, Mass.

[21] Appl. No.: 327,742

[22] Filed: Oct. 24, 1994

[51] Int. Cl.$^6$ ................................................ G01B 5/04
[52] U.S. Cl. ........................ 356/381; 356/383; 356/384
[58] Field of Search .................................. 356/376, 375, 356/379, 381, 383, 384, 385

[56] References Cited

U.S. PATENT DOCUMENTS

| | | | |
|---|---|---|---|
| 4,677,302 | 6/1987 | Chiu et al. | 250/560 |
| 4,751,570 | 6/1988 | Robinson | 358/88 |
| 4,796,997 | 1/1989 | Svetkoff et al. | 356/376 |
| 4,803,371 | 2/1989 | Durland | 356/383 |
| 4,907,169 | 3/1990 | Lovoi | 364/513 |
| 4,937,445 | 6/1990 | Leong et al. | 356/381 |
| 4,978,220 | 12/1990 | Abramovich et al. | 356/394 |
| 5,005,147 | 4/1991 | Krishen et al. | 364/578 |
| 5,243,665 | 9/1993 | Maney et al. | 382/8 |
| 5,311,599 | 5/1994 | Freischlad | 356/376 |
| 5,398,113 | 3/1995 | de Groot | 356/376 |

Primary Examiner—Richard A. Rosenberger
Attorney, Agent, or Firm—Ozer M. N. Teitelbaum

[57] ABSTRACT

The present invention teaches a system for measuring the height of an object having an outer surface. The system comprises a system for generating an energy beam along a path, such as light, having a structured pattern, wherein the structured pattern of the energy beam irradiates the outer surface of the object. The structured light pattern comprises a constant dimension. The system further comprises a sensor for sensing the outer surface of the object irradiated by the structured pattern. Moreover, the system comprises a system for calculating the height of the object in response to the constant dimension of the structured pattern irradiating the outer surface of the object and sensed by the sensor. This system for calculating the height of the object preferably comprises a programmed computer containing a series of algorithmic steps for deriving a refined overall height profile of the object.

20 Claims, 13 Drawing Sheets

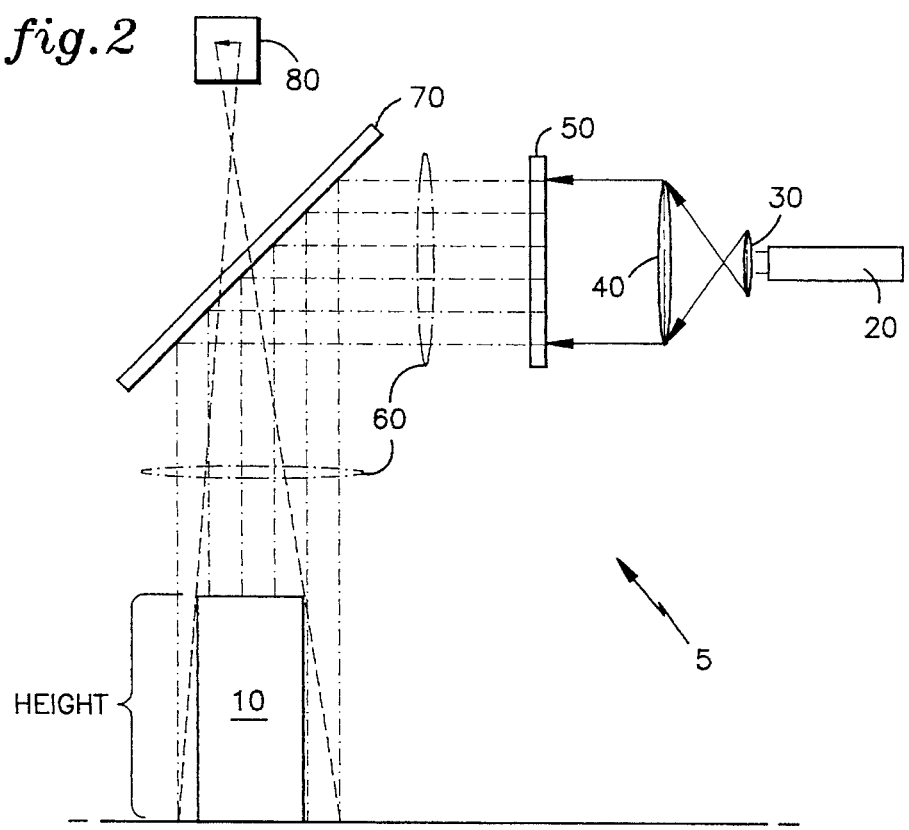
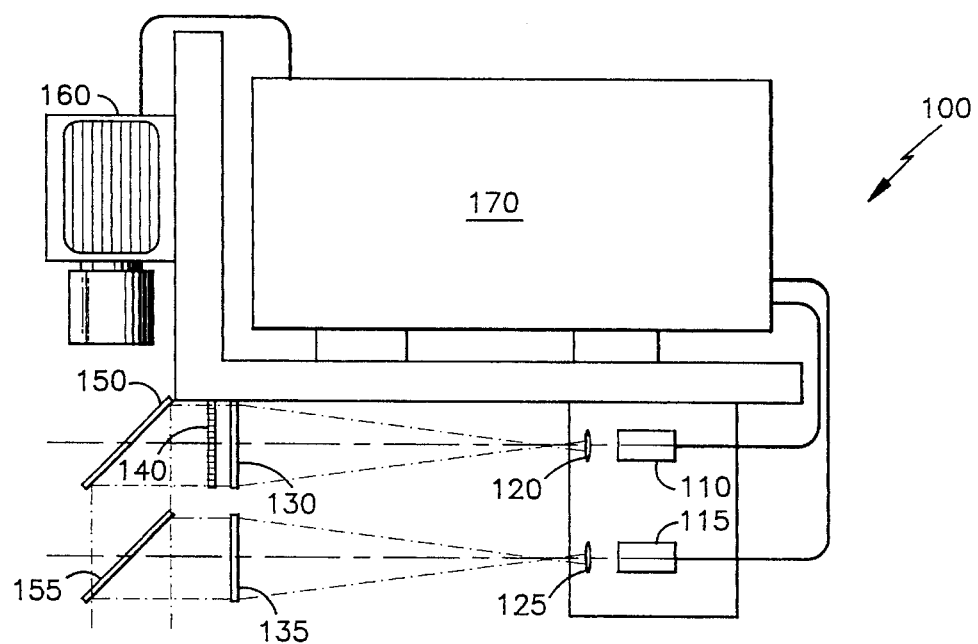

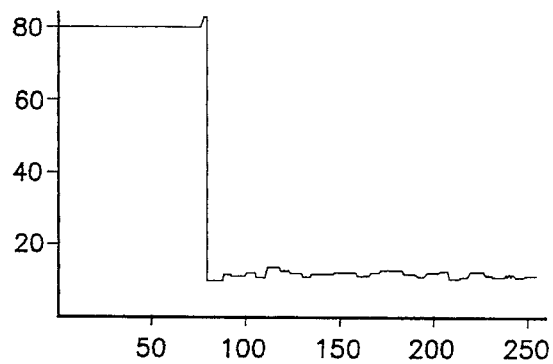
*fig.5(d)*
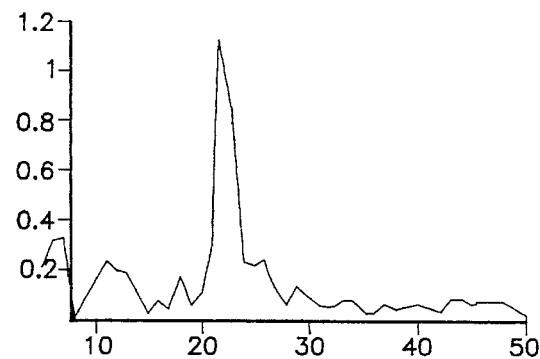
*fig.5(e)*
*fig.6*
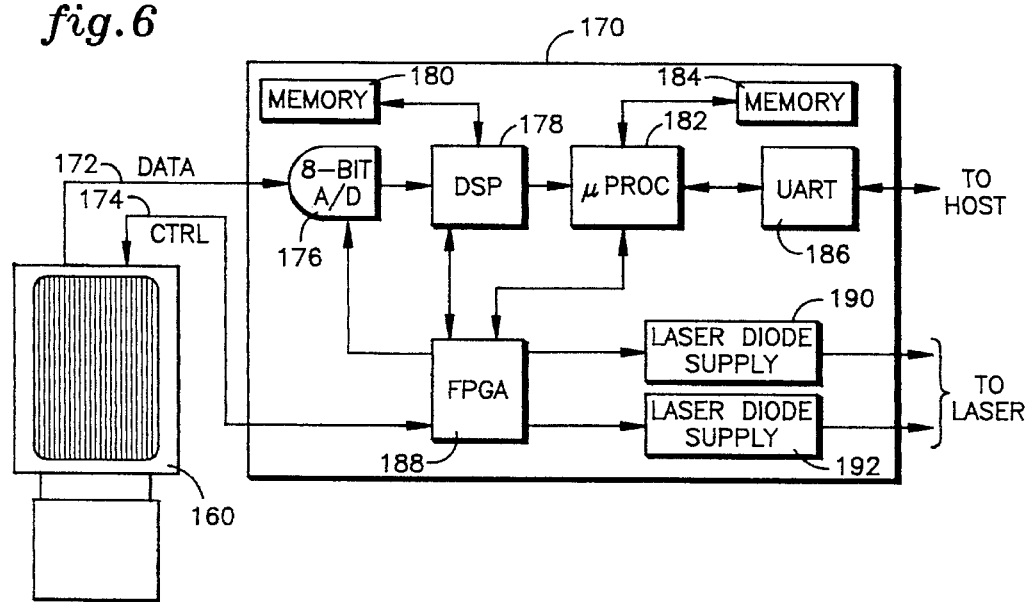

fig.10(a)
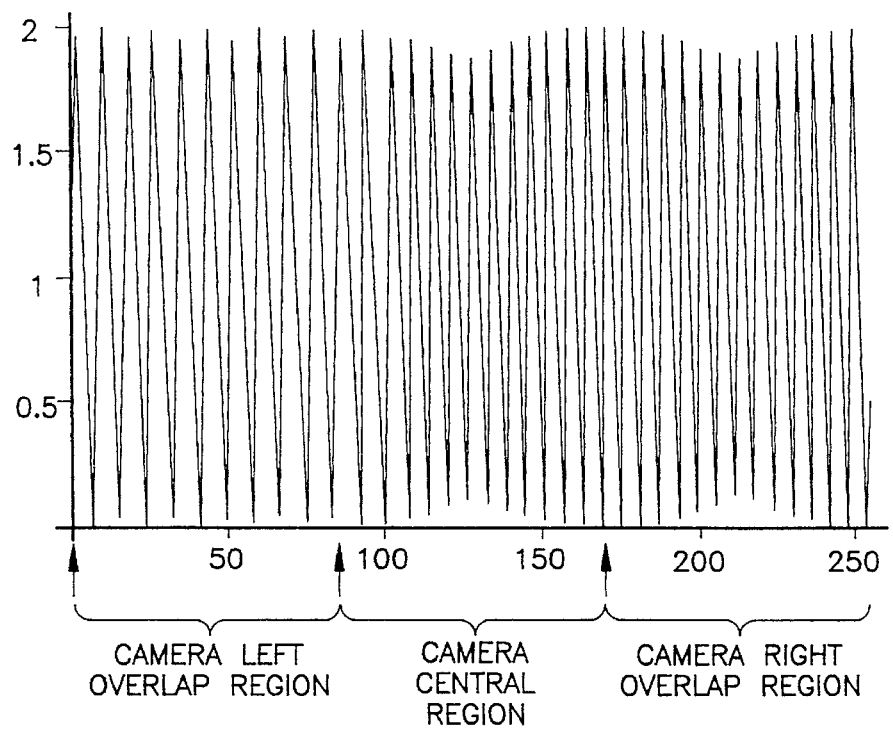
CAMERA LEFT OVERLAP REGION    CAMERA CENTRAL REGION    CAMERA RIGHT OVERLAP REGION
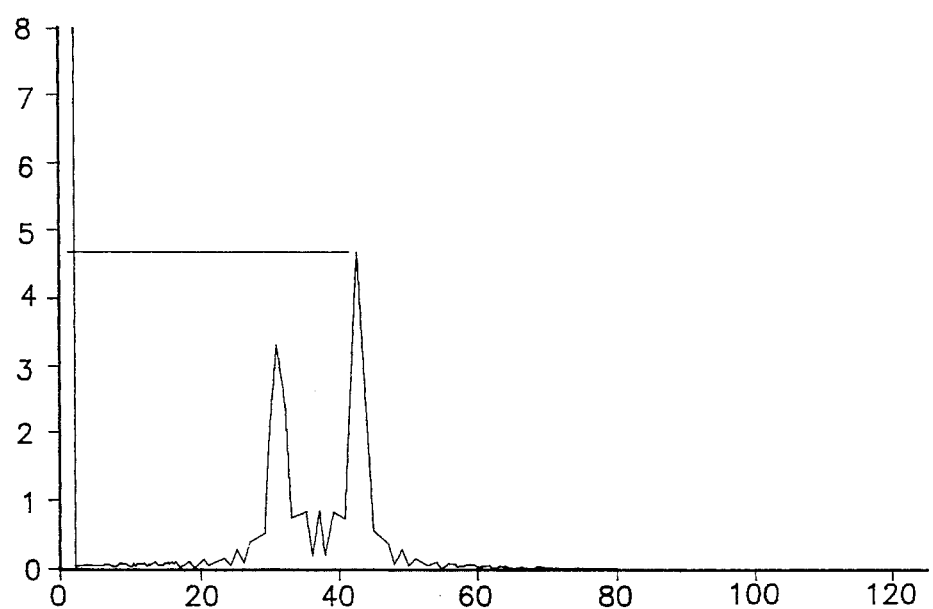
fig.10(b)

SYSTEM FOR DIMENSIONING OBJECTS

TECHNICAL FIELD

This invention relates to the field of package handling systems, and more particularly, to a system for dimensioning objects.

BACKGROUND ART

In a large number of package handling systems, labels are located and scanned for processing packages. Labels typically utilize a bar code representing various data including routing and destination information. To realize this end, an important step prior to locating and reading the label is dimensioning the package to focus the system's scanner on the bar code.

Several systems are presently known in the art for dimensioning packages. One known approach is commonly referred to as a machine vision system such as the method and system described in U.S. Pat. No. 4,796,997. Machine vision systems scan the surface of a package having a known set of coordinates to ascertain relevant dimensional data.

However, as illustrated in FIG. 1, in certain environments machine vision systems must account for packages having various sizes, shapes and orientations. Here, the coordinates of the package's scanned surface are unknown and may substantially vary. These shortcomings have limited the application of machine vision systems to systems where the coordinates of the package's labels are known.

Thus, a need exists for a system and method for dimensioning packages of various sizes, shapes, and orientations such that the location of the label can be determined.

DISCLOSURE OF THE INVENTION

The primary advantage of the present invention is to overcome the limitations of the known art.

Another advantage of the present invention is to provide a system and method for dimensioning objects of various sizes, shapes, and orientations.

A further advantage of the present invention is to provide a system and method for determining the topography of an object.

Other aspects and advantages will become apparent to those skilled in the art from the following detailed description read in conjunction with the appended claims and the drawings attached hereto.

In order to achieve the advantages of the present invention, a system is disclosed for measuring the height of an object having an outer surface. The system comprises a system for generating an energy beam having a structured pattern, wherein the structured pattern of the energy beam irradiates the outer surface of the object and comprises a constant dimension. The system further comprises a sensor for sensing the outer surface of the object irradiated by the structured pattern. Moreover, the system comprises a system for calculating the height of the object in response to the outer surface of the object irradiated by the structured pattern and sensed by the sensor.

In a second embodiment of the present invention, a method is disclosed for developing a profile of an object having an outer surface, a height and an edge. The method comprises the step of sensing the outer surface of the object illuminated by a structured light pattern falling within a field of view of a sensor, wherein the field of view having a left, a center, and a right region. Subsequently, a spatial transform is performed on the structured light pattern sensed within the field of view, and the left, center, and right regions. The height of the object is then calculated in response to the spatial transforms performed on the structured light pattern sensed within the field of view, and the left, center, and right regions such that a height profile is created for the field of view, and the left, center, and right regions. Furthermore, the method comprises the step of sensing the outer surface of the object uniformly illuminated by a second light beam falling within said field of view of said sensor such that a light intensity profile is created for said field of view, and said left, center, and right regions. The edge of the object is then located in response to the outer surface of the object illuminated by the second light beam and sensed by the sensor.

BRIEF DESCRIPTION OF THE DRAWINGS

The present invention will be better understood from reading the following description of non-limited embodiments, with reference to the attached drawings, wherein below:

FIG. 2 illustrates a first embodiment of the present invention;

FIG. 4 illustrates a second embodiment of the present invention;

FIGS. 5(a) through 5(e) details a first aspect of the second embodiment of the present invention;

FIG. 6 further details a second aspect of the second embodiment of the present invention;

FIGS. 10(a) and 10(b) illustrate the operation of the second embodiment of the present invention.

Figure 1:
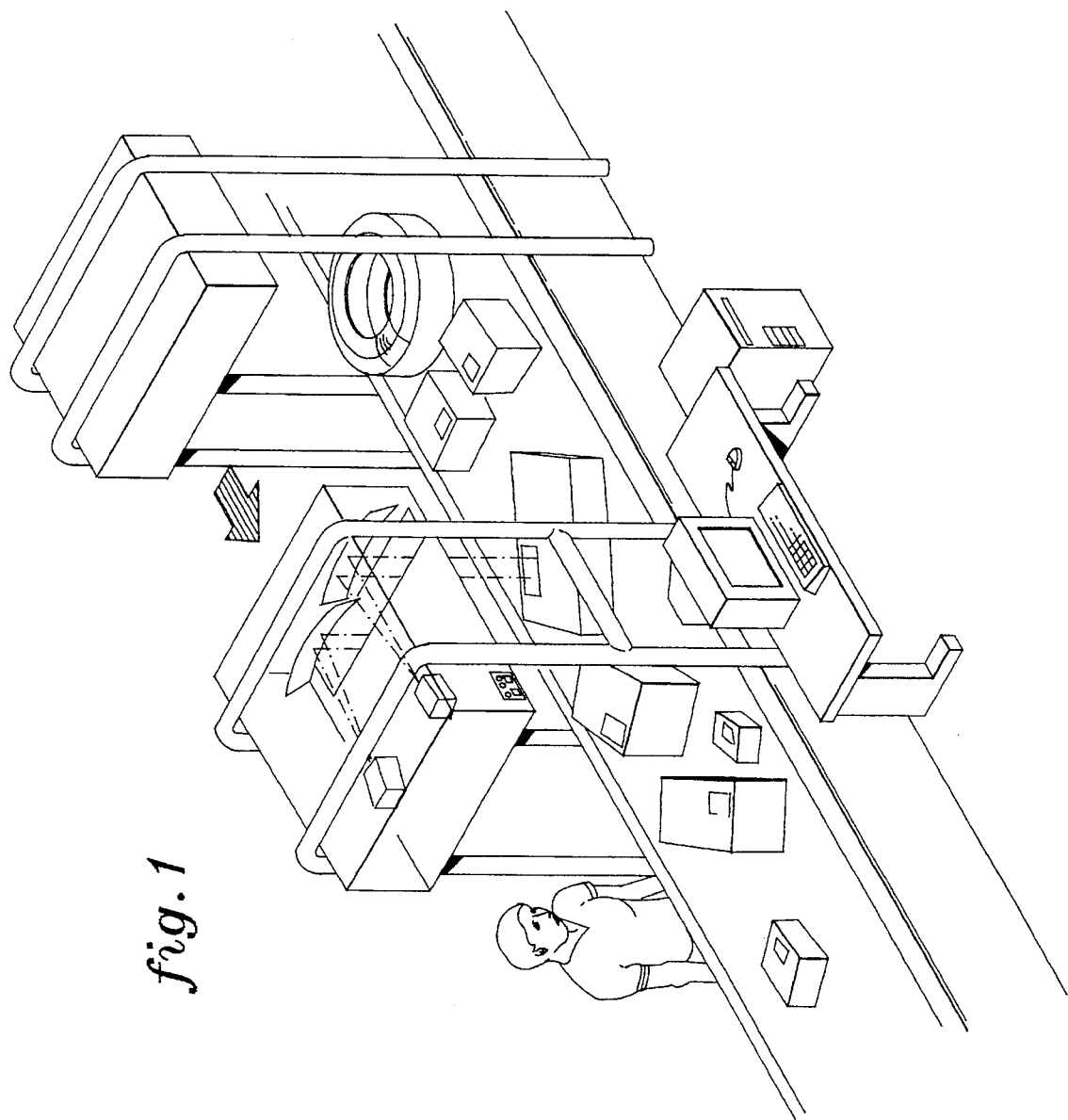
FIG. 1 illustrates a problem with prior art automated package handling system.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Referring to FIG. 2, a system 5 for measuring the height of an object 10 is illustrated according to a first embodiment of the present invention. System 5 comprises a source 20 for generating an energy beam 60 having a structured pattern. Structured pattern of energy beam 60 irradiates the outer surface of object 10. In practice, a segment of energy beam 60 may irradiate a portion of the outer surface of object 10. A sensor 80 is also incorporated for sensing the outer surface of object 10 irradiated by energy beam 60.

The structured pattern of energy beam 60 comprises a constant dimension. By employing a constant dimension, the scale of the energy beam 60 sensed by sensor 80 varies in direct proportion with the distance between sensed outer surface of the object and the sensor itself, thereby providing a system for measuring the object's height.

Moreover, system 5 comprises a system (not shown), preferably a computer, for calculating the height of the object in response to the sensing of the outer surface of the object 10 irradiated by the structured pattern. This system for calculating the height of the object is supported by the distance information derived from the scale data of the constant dimension of the structured energy pattern sensed by the sensor 80.

The system for calculating the height can be realized using any one of several schemes. In one approach, referred to as "cross correlation," the system for calculating the height comprises a system (not shown) for recognizing the structured pattern irradiating the outer surface and sensed by the sensor 80. Further, utilizing this cross correlation approach, the system for calculating the height further comprises a matching system (not shown) for cross correlating the structured pattern recognized by the system for recognizing with a stored pattern from a library of stored patterns. By this arrangement, a best match is made between the library of stored patterns and the structured pattern as recognized in order to determine the height of the object. Furthermore, the matching system also comprises a programmed computer (not shown) for matching the recognized pattern with the best stored pattern from library of stored patterns.

In the second and preferred approach for configuring the system for calculating the height, a system (not shown) is incorporated for performing a spatial transform on the outer surface of object 10 irradiated by the structured pattern and sensed by sensor 80. This system for performing a spatial transform also comprises a programmed computer for executing the spatial transform and for calculating the height in response to the spatial transform performed.

The system for performing a spatial transform may be realized in a variety of techniques. One such technique employs global forms, such as a Fast Fourier Transform ("FFT"), a Walsh Transform, or a Hadamard Transform for example. Using global forms allows all available sensor data from the surface of the object in every measurement. As such, this realization is preferable because of its ability to operate in the presence of noise and interference patterns—graphics on the measured object—with the most ease. However, a relatively large number of computational steps are required to develop the global transforms.

In another approach, the system for performing a spatial transform is realized by local forms. Local forms involve measuring the periodicity of the constant dimension of the structured pattern. This may be realized, in view of the preferred embodiment detailed below, by measuring the scale of the energy beam 20 as sensed by sensor 80. Other realizations may be derived by one of ordinary skill in light of the present disclosure. Unlike the global realization, local forms are more susceptible to noise. Nonetheless, local forms are much simpler to execute and therefore are less expensive to implement.

In FIG. 2, several elements are detailed which embody a preferred realization of the present invention. While an energy beam, such as microwave energy for example, may be employed for the purpose of configuring the present invention, the system for generating an energy beam 20 is preferable a light source, such as, for example, a laser diode. Other energy sources having a constant source structured pattern would be obvious to one of ordinary skill in the art and as such are not detailed here.

In utilizing a light source for generating the energy beam, a focusing lens 30 is incorporated in system 5. Focusing lens 30 focuses the light beam generated by light source 20, and thereby generates a focused light beam onto a collimating lens 40. Collimating lens 40 functionally collimates the focused light beam output of focusing lens 30. The collimated focused light beam is then directed at a striped binary mask 50 for generating the structured light pattern 60 having a predetermined number of stripes. In one arrangement of the present embodiment, structured pattern 60 illuminates object 10 by means of a beam splitter 70.

Figure 3A:
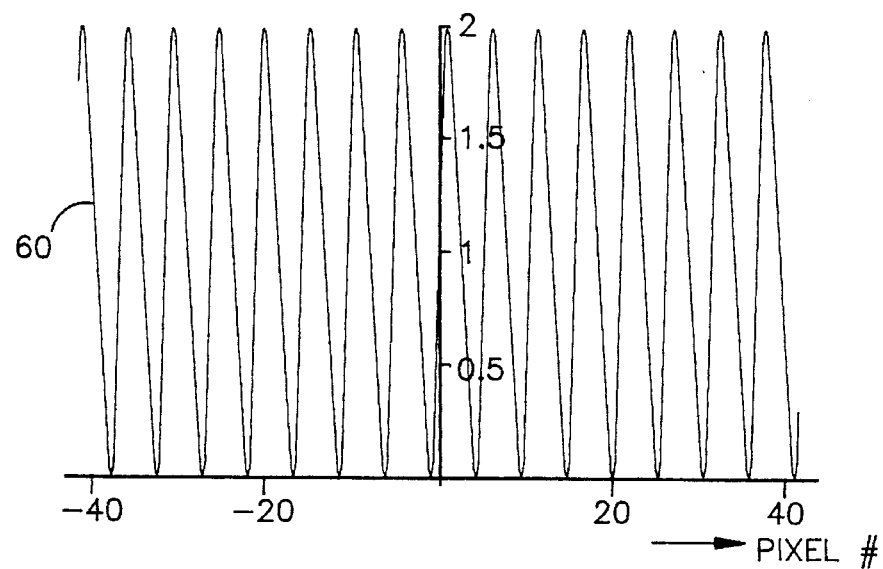
FIGS. 3(a) and 3(b) illustrate one aspect of the operation of the first embodiment of the present invention.
Figure 3B:
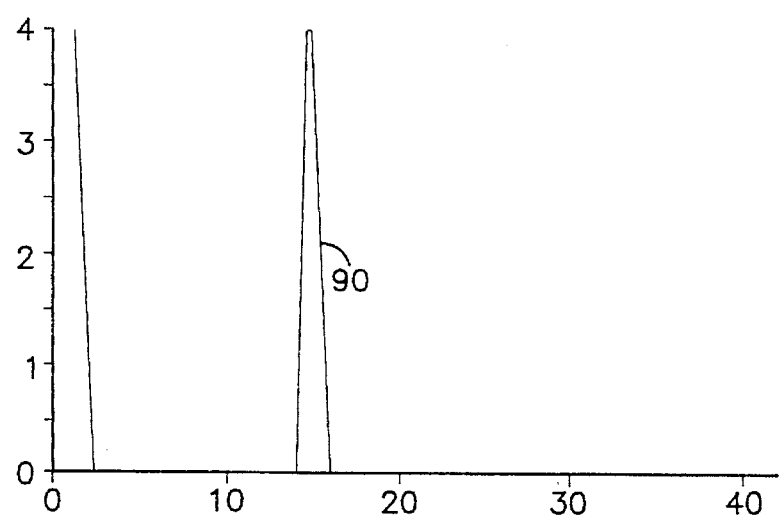

Referring to FIGS. 3(a) and 3(b), a first aspect of the operation of the first embodiment of the present invention is illustrated. In FIG. 3(a), the structured pattern 60 as received by sensor 80 is shown. FIG. 3(b) depicts the operation of the second configuration of the system for calculating the height, and more particularly, the result of a Fast Fourier Transform ("FFT") 90 on the structured pattern 60 of FIG. 3(a). Having performed the FFT 90, the height of the object is derived.

Referring to FIG. 4, a system 100 is illustrated for measuring the height and profile of an object 10 according to a second embodiment of the present invention. System 100, like the preferred realization of system 5 particularly defined in FIG. 2, utilizes a structured light pattern having a constant dimension to determine the height of object 10. Here, the structured light pattern is realized by means of a first pulsed diode laser 110. First pulsed laser diode 110 generates a light beam which is focused by means of focusing lens 120. The output of focusing lens 120 is directed at a fresnel collimating lens 130. A structured light reticle 140, such as a striped binary mask, is then positioned along the path of the output of the fresnel collimating lens 130 to generate a structured light pattern having a constant dimension. The structured light pattern is subsequently translated to the position of object 10 by means of a beam splitter 150. It should be noted that the orientation of the stripes of binary mask can vertical, as shown, or horizontal, which is preferred.

Additionally, system 100 further comprises a second light source 115. Second light source 115 preferably comprises a second pulsed laser diode. Similar to first pulsed laser diode 110, second pulsed laser diode 115 is optically coupled with a focusing lens 125 which in turn is optically coupled with a collimating lens 135 to generate a collimated focused light beam. Unlike the structured light pattern output resulting from the first pulsed laser diode 110, the resulting output of second pulsed laser diode 115 is directed at object 10 by means a beam splitter 155 to substantially eliminate or reduce the potential for any transformation or shadowing effects. The resulting output comprises an intensity and illuminates the object's outer surface uniformly to effectively remove markings on the object that would interfere with the operation of the present invention, as detailed hereinbelow.

System 100 also comprises a sensor 160, which preferably comprises a linear camera. It should be apparent to one of ordinary skill in the art that a multiple number of sensors can be employed to overcome several distinct problems, as detailed hereinbelow.

Sensor 160 performs several functions. Firstly, sensor 160 senses the structured light pattern which illuminates the outer surface of object 10. Second, sensor 160 also senses the intensity of the light beam, generated by second pulsed light source 115, illuminating the outer surface of the object. Both functions are realized by coordinating beam splitters 150 and 155 along a singular axis in line with sensor 160. By doing so, the present invention requires only one sensor to determine the height and profile of object 10. This aspect of the present embodiment is further realized using first and second pulsed light sources 110 and 115. By relying on first and second pulsed light sources 110 and 115, a system is thus provided for enabling the first light source 110 while disabling the second light source 115, as well as for enabling the second light source 115 while disabling the first light source 110.

Figure 8:
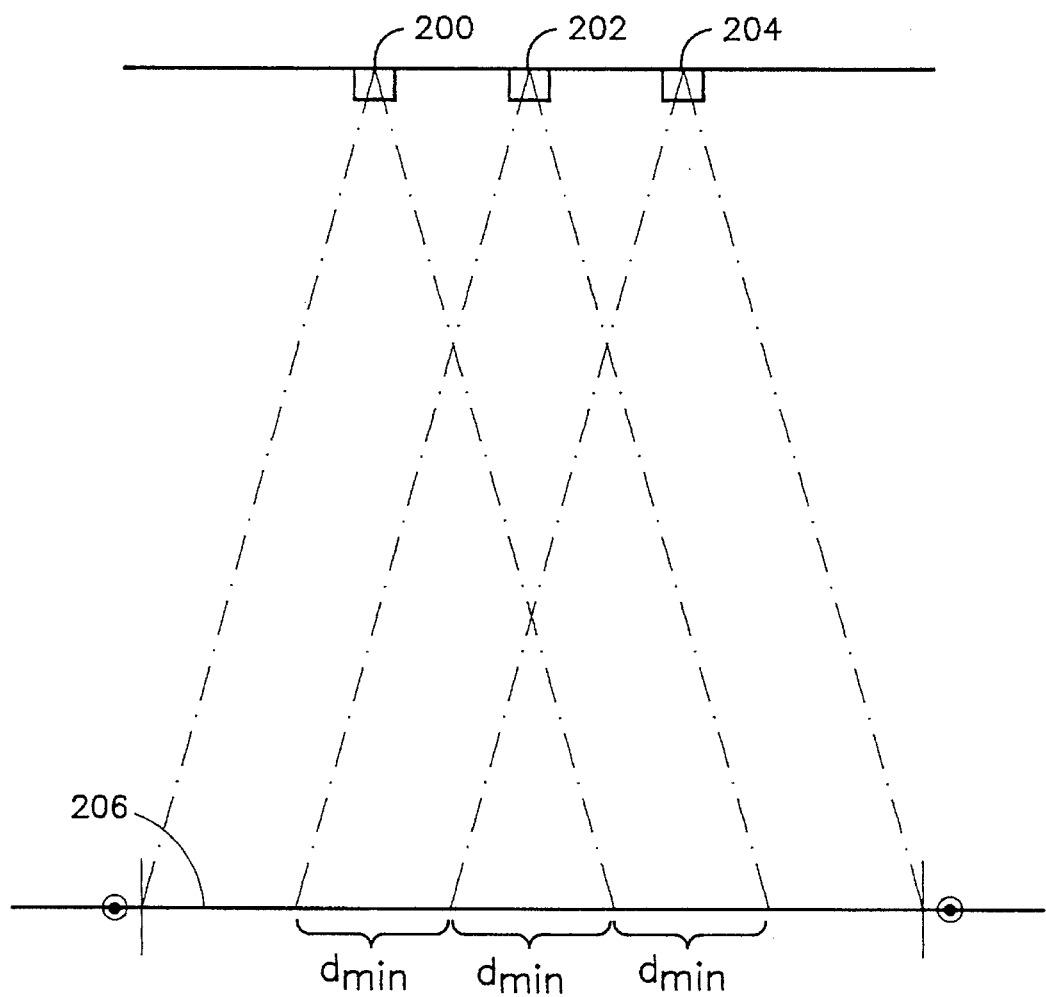
FIG. 8 further details a second aspect of the second embodiment of the present invention.

In the preferred embodiment of the present invention, sensor 160 comprises a first, second and third camera sensor, shown in FIG. 8, such that the second and third cameras are positioned adjacent to the first. Each of these cameras comprise a field of view. By this arrangement, depending on the height of the object and its position within each camera's field of view, the field of view of the first (central) camera comprises a left, a center and a right region.

Upon deriving measurements for the left, center and right regions of the first camera for both the structured light pattern and the second light beam which, at alternating times, illuminate the surface of the object, system 100 determines the height and profile of object 10 by means of an electronic processor and control module 170. In the preferred embodiment, module 170 performs a Fast Fourier Transform on the measurements for the left, center and right regions of the first camera for the structured light pattern. Once these FFTs are performed, the module 170, in conjunction with a series of the algorithmic operations, functionally calculates the height of the object and derives its profile.

Referring to FIGS. 5(a) through 5(e), a first aspect of the second embodiment of the present invention is illustrated. Here, the benefits of using a second light source for uniformly illuminating the object, such as second light source 115, can be best viewed.

Figure 5A:
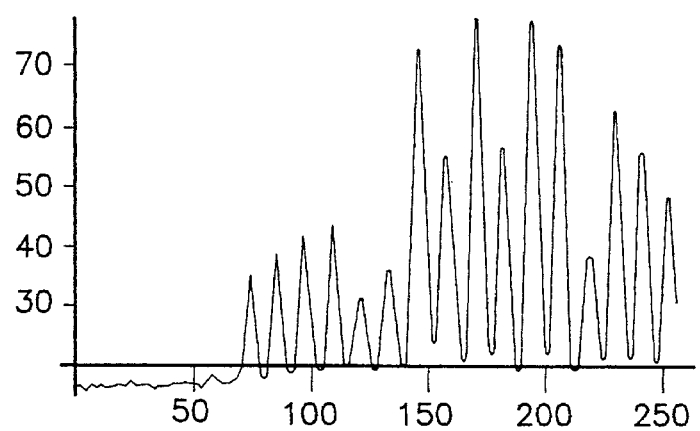

In FIG. 5(a), a structured light pattern is shown as received by sensor 160. In this scenario, the object comprises unwanted printing or markings on the outer surface sensed by sensor 160. This printing causes interference with the structured pattern illuminating the outer surface of the object. Thus, the pattern received by sensor 160, shown in FIG. 5(a), comprises a noise pattern.

Figure 5B:
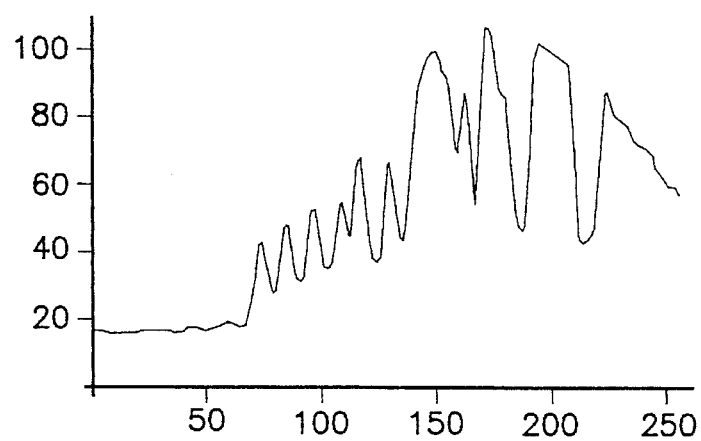

In order to remove the system's sensitivity towards the noise of FIG. 5(b), a system (not shown) for removing the affects of these unwanted markings on the structured pattern received by sensor 160. This system for removing these unwanted affects comprises second light source 115. Second light source 115 primarily generates a light beam which uniformly illuminates the object's outer surface. The illumination of the outer surface by this light beam is also sensed by sensor 160. These received results are illustrated in FIG. 5(b).

Figure 5C:
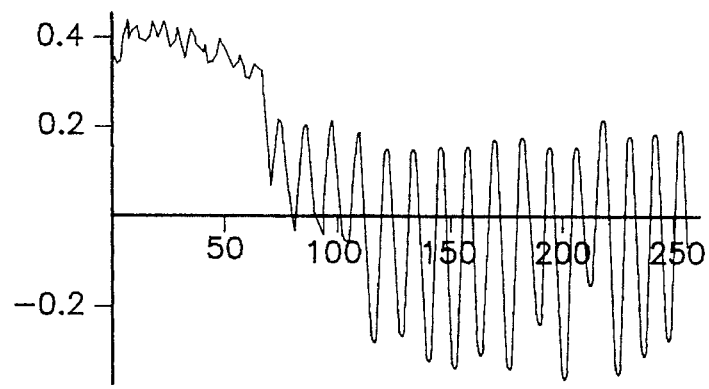

The system for removing the affects of the unwanted markings further comprises a system (not shown) for dividing the received structured pattern of FIG. 5(a) with the received results of FIG. 5(b). The results of this system for dividing are depicted in FIG. 5(c). The pattern of FIG. 5(c) provides a more manageable resultant pattern for calculating the height and profile of the object. With respect to FIG. 5(c), FIG. 5(d) illustrates the object's height profile employing a local form technique, while FIG. 5(d) illustrates the object's height profile derived by means of a global form technique.

Referring to FIG. 6, a detailed configuration of module 170 is illustrated. Coupling module 170 with sensor 160 are a pair of communication lines; a data line input 172 and a control line output 174. Data line input 172 transmits the sensed data of the object from sensor 160 to module 170. It should be noted that in the preferred embodiment of the present invention, module 170 operates at a low data rate.

Upon receiving data line input 172, module 170 transforms this object information into the digital domain by means of an analog to digital ("A/D") converter 176. A/D converter 176 preferably employs an 8 bit scheme. Coupled with A/D converter 176 is a digital signal processor ("DSP") 178 so as to enable DSP 178 to receive as its input the digital output of A/D converter 176. In the preferred embodiment, the functional purpose of DSP 178 is solely to perform repetitive mathematical operations in sequence, such as height extraction by means of Fast Fourier Transforms. As such, DSP 178 requires no decision making or branching capabilities. To assist it in its calculations, DSP 178 employs a scratch memory device 180 for temporary storage. In the preferred embodiment, DSP 178 is an MC 32C030.

Furthermore, coupled with DSP 178 is a microprocessor 182, preferably from the 68000 series. Microprocessor 182, accepting the output of DSP 178 as its input, functionally performs the decision making and branch intensive tasks of module 170, such as edge computation and control. Microprocessor 182, as with DSP 178, utilizes a scratch memory device 184 for temporary storage, and interfaces bidirectionally with an interface device 186, such as an Universal Asynchronous Receiver Transmitter ("UART"). Interface device 186 accepts the output of microprocessor 182 and interfaces with a host for systematic control.

Module 170 additionally comprises a Field Programmable Gate Array ("FPGA") 188. As the preferred embodiment requires several sensors, FPGA 188 functionally links these devices, which are adjacent, together. This is achieved by two way interfacing FPGA 188 with both DSP 178 and microprocessor 182. FPGA further controls the clock of A/D converter 176, as well as laser diode supplies, 190 and 192, which ultimately control first and second pulsed laser diodes. Finally, FPGA 188 generates the control line output 174 to control sensor 160 in view of the additional sensors employed.

Figure 7A:
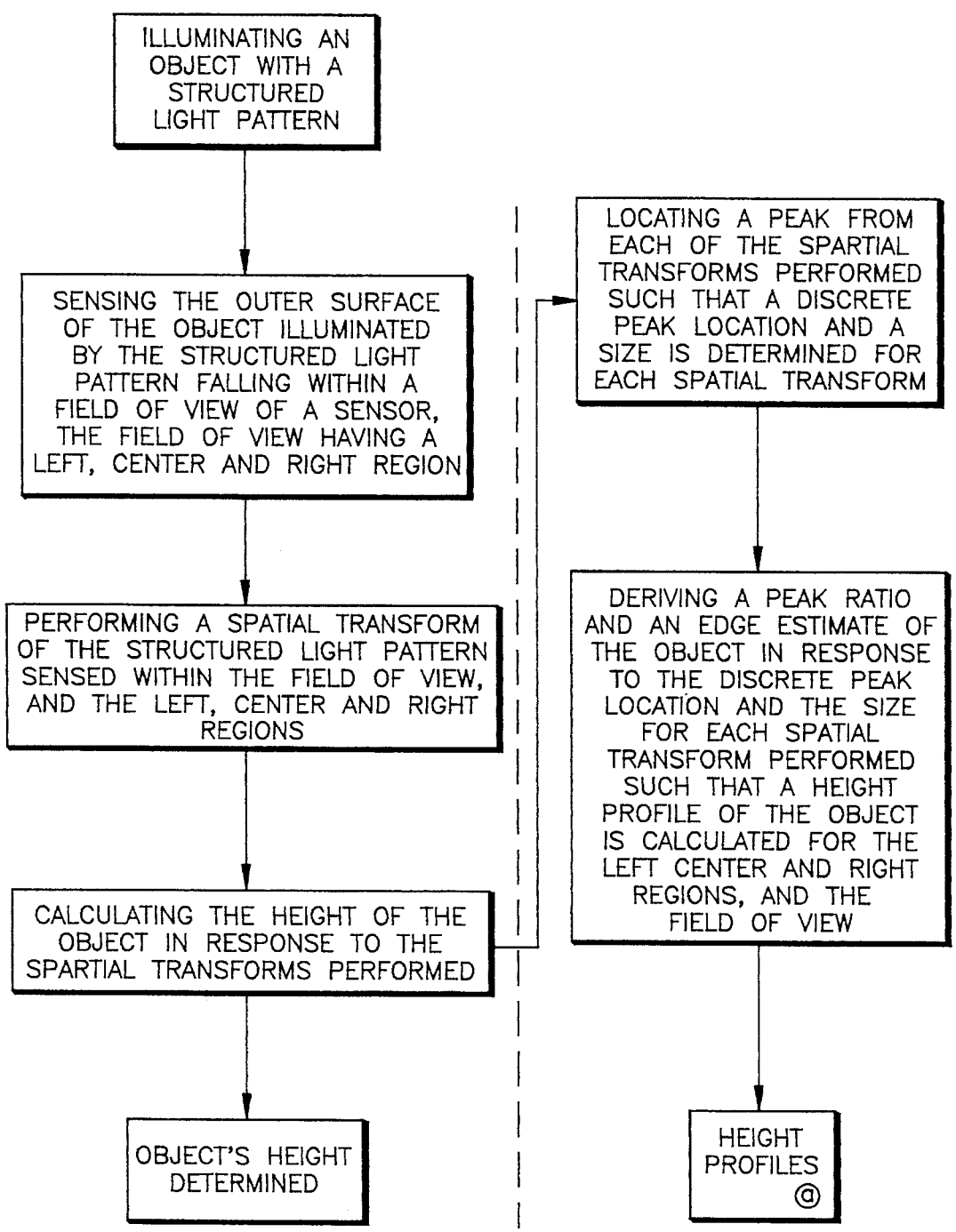
FIGS. 7(a) through 7(d) illustrate the sequence of steps of an algorithm performed by the first aspect of the second embodiment.

Referring to FIGS. 7(a) through 7(d), the sequence of steps of the algorithm performed by module 170 in calculating the object's height and profile are illustrated. With particular reference to FIG. 7(a), prior to module 170 executing the algorithmic series of the operations, the outer surface of the object is illuminated by the structured light pattern and then sensed by the sensor within its field of view, as described hereinabove. Once sensed, the algorithm initially performs a spatial transform on the field of view and its subcomponents—the left, center, and right regions— resulting in group of height profiles. As a result, the height of the object may then be determined in response to the group of height profiles by means of a step for calculating the height of the object.

It should be noted that the step of calculating the height of the object in response to the spatial transforms executed comprises several independent steps. Firstly, a peak is located from each of the spatial transforms. By performing this step, the algorithm generates a discrete peak location and a size for each spatial transform. Once executed, a peak ratio and edge estimate of the object is derived. These measurements are obtained in response to the discrete peak location and the size generated for each spatial transform. As a result, a height profile is calculated for the left, center and right regions, as well as the field of view itself. With the height profile determined, a refined overall height profile is thus ascertainable employing the steps shown in FIGS. 7(c) and 7(d).

Figure 7B:
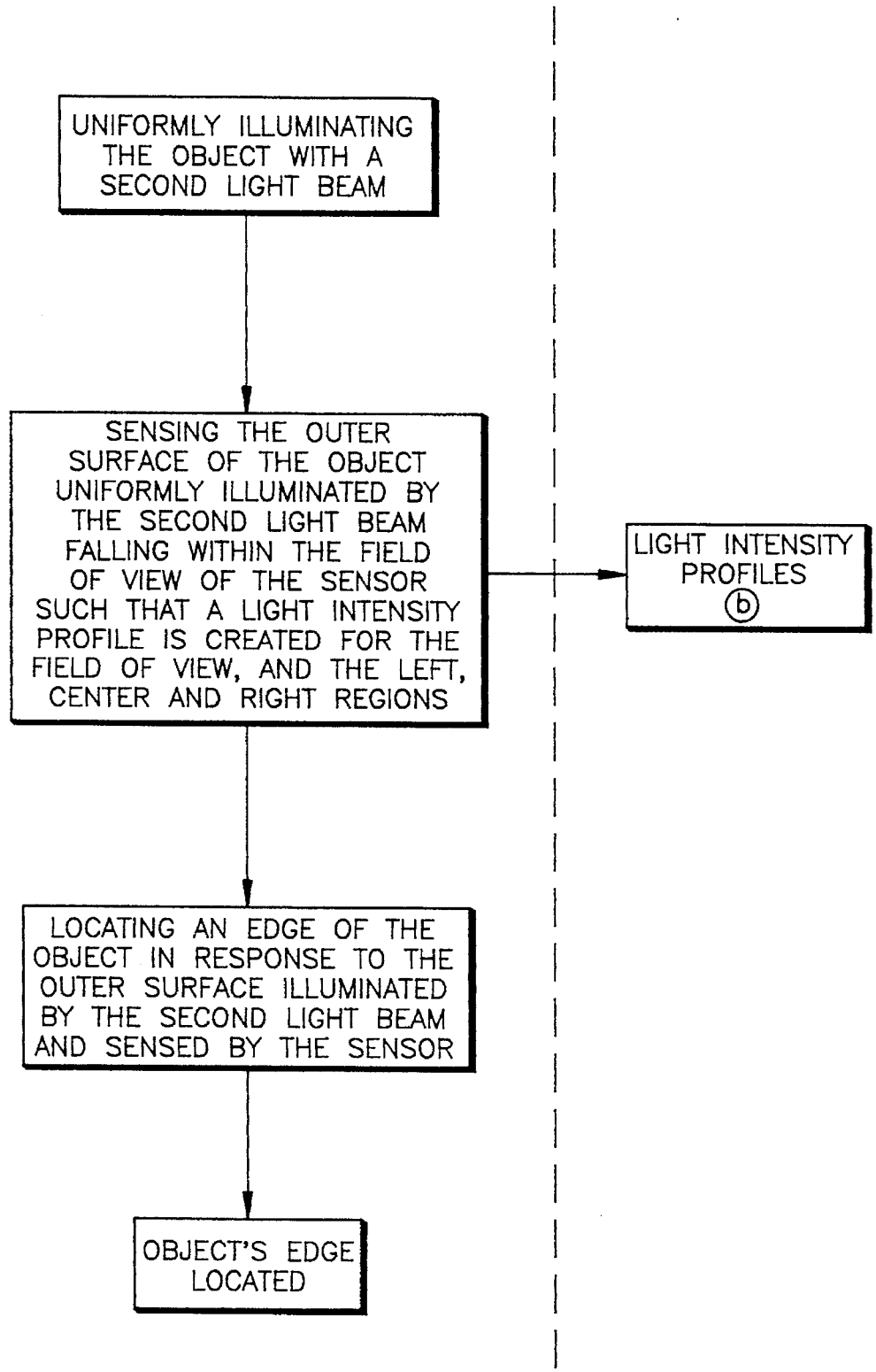

Referring to FIG. 7(b), prior to module 170 executing the algorithm series of the operations, the outer surface of the object is illuminated by the second light beam and then sensed by the sensor within its field of view and its sub-components—the left, center, and right regions—yielding a group of light intensity profiles. An edge of the object may then be located in response to group of light intensity profiles. With the light intensity profiles determined, employing the steps shown in FIGS. 7(c) and 7(d), the refined overall height profile may then be derived.

Figure 7C:
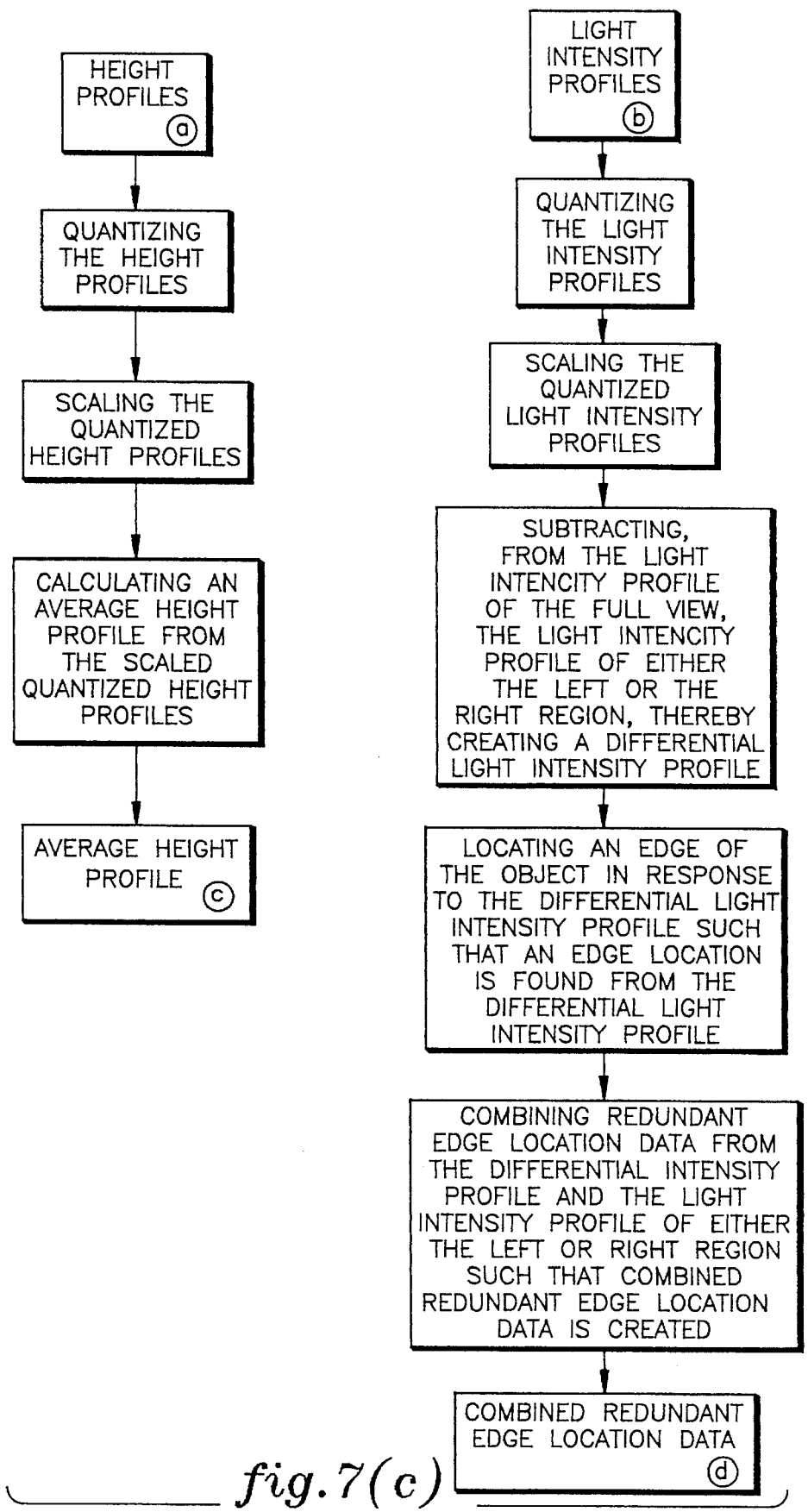
Figure 7D:
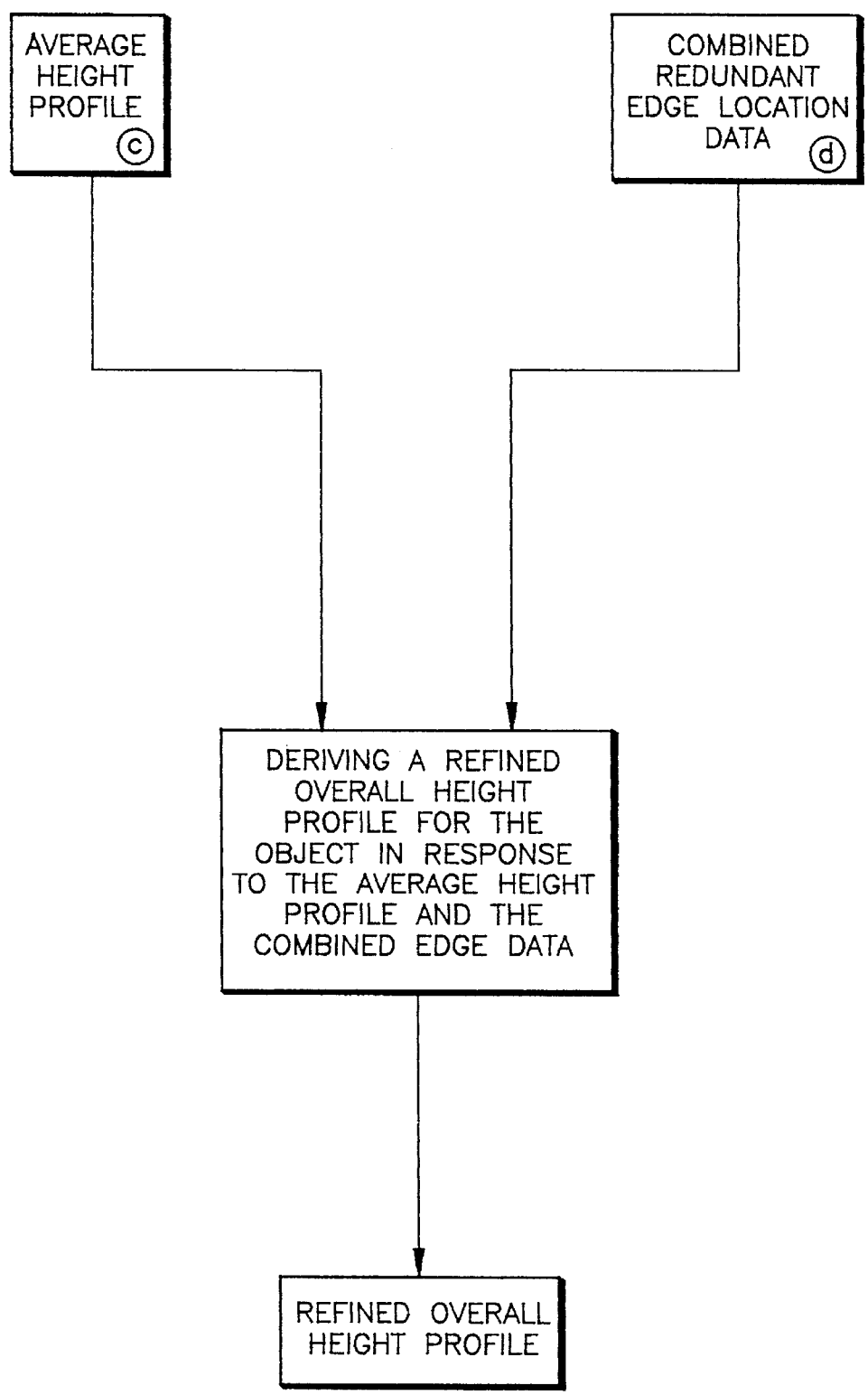

Referring to FIGS. 7(c) and 7(d), a detailed illustration of the algorithmic sequence of steps is provided for calculating the height of the object in response to the group of height profiles and locating the edge in response to the group of light intensity profiles. By its configuration, module 170 can simultaneously process both height and light intensity profiles to ultimately arrive at a refined overall height profile.

With respect to the height profiles, module 170 first quantizes and then scales this group. These steps involve transforming the group from local pixel space to an absolute spacing, and then transforming the group in absolute spacing to a discretized grid space. Subsequently, an average height profile is then calculated from the quantized and scaled group. The average height profile is used in subsequent processing steps of the algorithm, as illustrated in FIG. 7(d).

Moreover, module 170 also quantizes and scales the group of the light intensity profiles. As with the height profiles, these steps involve transforming the group from local pixel space to an absolute spacing, and then transforming the group in absolute spacing to a discretized grid space. Once in discretized grid space, the quantized and scaled light intensity profile of the full view is subtracted from the quantized and scaled light intensity profile of either the left or right region, thereby creating a differential light intensity profile. An edge of the object is then located in response to the differential light intensity profile. Once the edge is located, redundant edge location data from the differential intensity profile is combined with edge data from the light intensity profile of the left of right region of the field of view such that combined redundant edge location data is created. As shown in FIG. 7(d), the combined redundant edge location data is employed in the subsequent processing steps of the algorithm.

Referring to FIG. 7(d), the completed algorithm is illustrated upon determining the average height profile and the combined redundant edge location data. A refined overall height profile for the object is derived in response to the average height profile and the combined redundant edge location data. By way of this refined overall height profile, a set of data is available to achieve the various goals stated herein, as well as realize additional benefits apparent to one of ordinary skill in the art.

It should become apparent to one of ordinary skill in the art that by combining module 170 with the hereinabove detailed algorithm, several particular functions are achieved. It can therefore be said that module 170 comprises several new elements, though these elements reside within the combination of the algorithm and module itself. Nonetheless, these elements may be realized by others skilled in the art using another combination of hardware and software.

Furthermore, in view of the above, module 170 can thus be said to comprise a system for calculating the height of the object in response to the spatial transforms performed, as described hereinabove. Thus, through the above combination, the system for calculating the height of the object comprises a system for inputting each of the spatial transforms, and a system for locating a peak from each of the transforms to generate a discrete peak location and a size. Moreover, the system for calculating the height also comprises a system for deriving a peak ratio and an edge estimate of the object in response to the discrete peak location and the size for each spatial transform such that a group of height profiles are created.

In a further embodiment, the system also comprises a system for calculating an average height profile from the height profiles of the left, center and right regions and the from the field of view as a whole. Furthermore, given the above realization, the system itself additionally comprises a system for determining intensity profiles of the object for the left, center and right regions of the field of view, as well as the field of view as a whole, in response to the intensity of the light beam uniformly illuminating the outer surface of the object sensed by the sensor.

To achieve its functional purpose, the system for determining intensity profiles further comprises a system for subtracting the light intensity profile of either the left or right region from the light intensity profile of the field of view itself which generates an overall differential intensity profile. Additionally, the system for determining intensity profiles comprises a system for locating an edge of the object in response to the overall differential intensity profile, as well as a system for combining redundant edge location data from the overall differential intensity profile and edge data from said light intensity profile of said at least one of said left region and said right region such that combined redundant edge data is created.

In light of the above, a complete profile of the object can be obtained by incorporation a system for deriving a refined overall height profile for the object in response to the average height profile and the combined redundant edge data.

It should be additionally noted that in still a further embodiment of the present invention the system comprises a system for scaling both the height and light intensity profiles thereby resulting in coordinated height and light intensity profiles. Further, the system comprises a system for quantizing both coordinated height and light intensity profiles. The system scaling the height profiles resides in one embodiment in the system for calculating an average height profile, while the system for subtracting from the light intensity profile comprises the system for scaling the light intensity profiles.

Referring to FIG. 8, a multiple sensor configuration is shown. Here, three sensors 200, 202 and 204 and their interaction are illustrated. Further, the field of view of the sensors are shown intersecting with a base 206. In the preferred embodiment, the illuminated object (not shown) is positioned on base 206, which is a conveyor belt.

Each of these sensors comprises a field of view having a predetermined angle. As viewed from FIG. 8, the field of views for sensors 200 and 204 overlap the field of view of sensor 202. By way of these overlap areas, the field of view of sensor 202 comprises a left, center, and a right region. In the preferred embodiment, each of these regions, as well as the entire field of view of sensor 202 are employed for the purposes of calculating the refined overall height profile of the object, by determining the height and an edge of the object (not shown). It should be obvious to one of ordinary skill, that the sizes of each of the regions of the field of view of sensor 202 are dependent on the height and shape of the object and its relative position within the field of views of sensors 200, 202 and 204, the significance of which will become further apparent hereinbelow.

Figure 9:
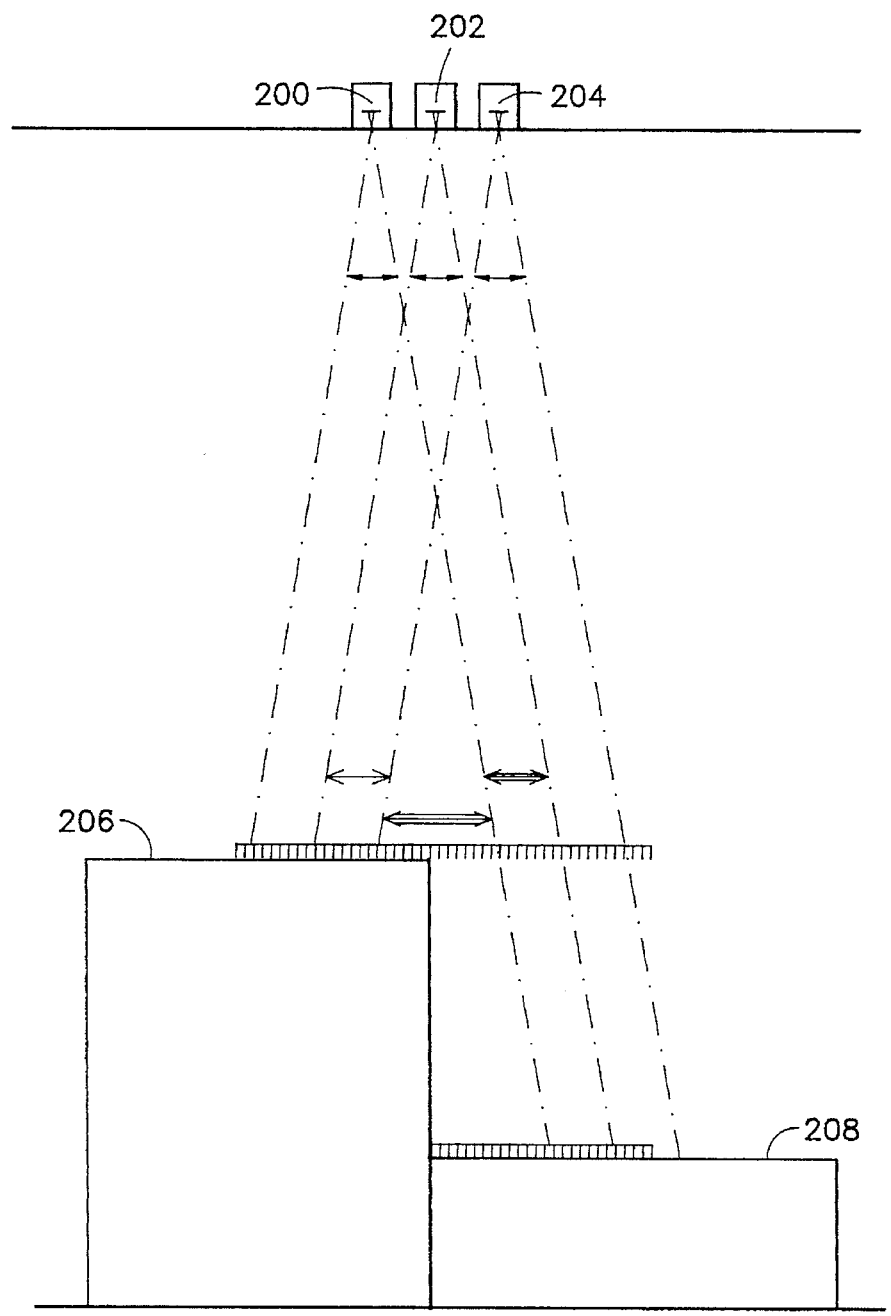
FIG. 9 illustrates a problem solved by the second embodiment of the present invention.

Referring to FIG. 9, a multiple object scenario using the multi-sensor format of FIG. 8 is illustrated. Complexities arise when attempting to determine a refined overall height profile for a first and second object, 206 and 208, positioned adjacently, having different heights and shapes and a boundary between occurring within a singular sensors field of view. In this scenario, an accurate refined overall height profile for neither object can be determined. As a result, in the preferred embodiment, a multi-sensor forest is employed. Further, the regions making the field of view of the central sensor, as well as the field of view itself, are all processed to provide sufficient detail to enable the system to calculate the overall refined height profiles of both object.

In FIG. 9, objects, 206 and 208, both fall within the field of views of one or more of sensors 200, 202 and 204. As the height profiles of both objects are required, a need exists for performing spatial transforms as well as other processing operations on the three regions of field of view of sensor 202, as well as the field of view of sensor 202 as a whole. To this end, these overlapping regions and their corresponding objects having particular portions illuminated by the structured light pattern are sensed by the relevant sensors and subsequently processed by module 180.

Referring to FIGS. 10(*a*) and 10(*b*), the operation of the electronic module in combination with the herein detailed algorithm is shown to illustrate the system's ability to determine the refined overall height profile of scenario posed in FIG. 9. In FIG. 10(*a*), the signal received by the electronic module as a result of the scenario of FIG. 9 is depicted. Upon its receipt, the electronic module in conjunction with the embedded algorithm performs a spatial transform, such as a Fast Fourier Transform ("FFT"), on the field of view as a whole, including the left, center and right regions. Each of these transforms, illustrated in FIG. 10(*b*), are subsequently processed by the module-algorithm to determine both object's overall refined height profile. It should be noted that the total spatial transform itself does not provide sufficient data as to the positioning of the objects relative to one another. To determine this information, separate transforms are needed for the left and the right regions of the field of view.

Figure 11:
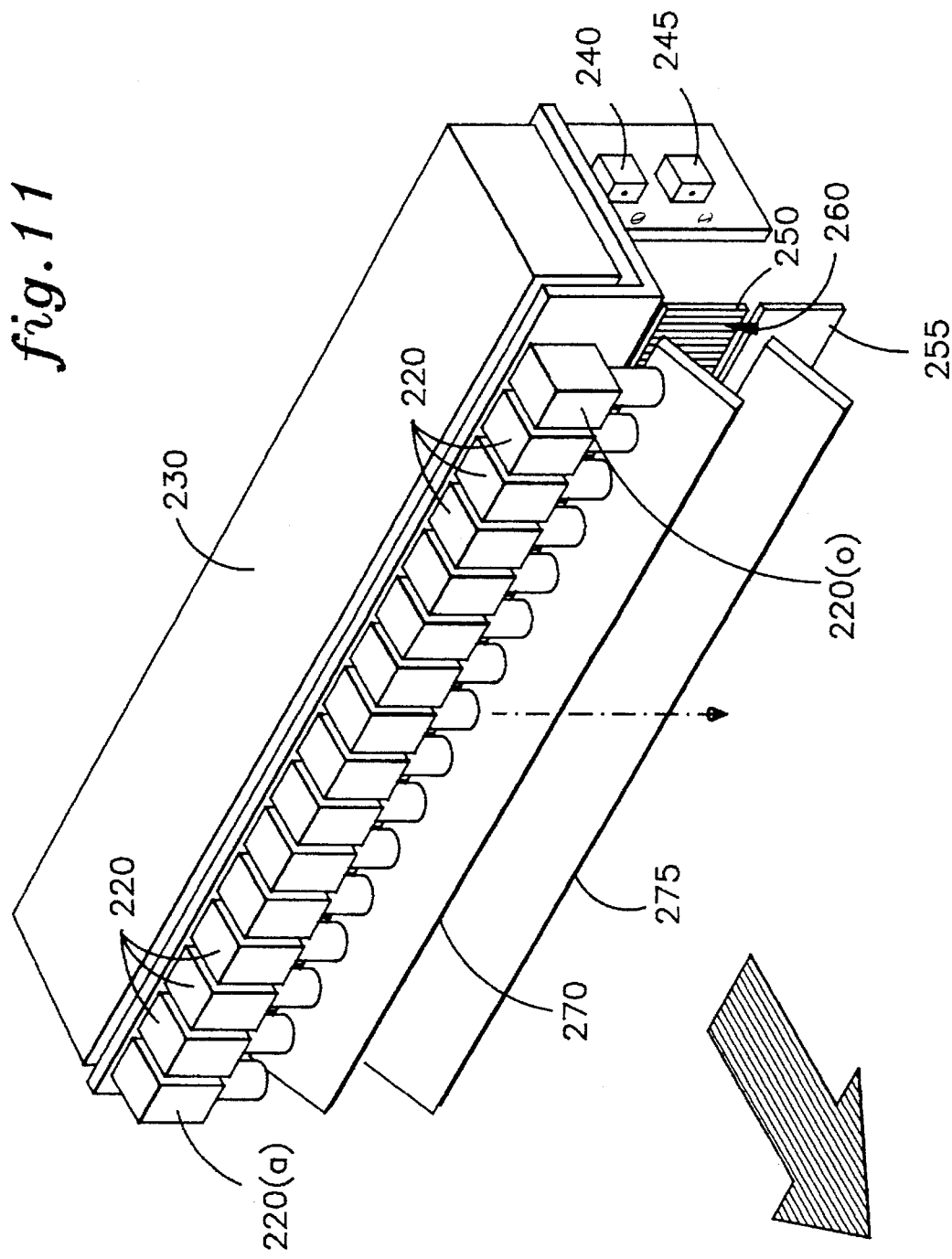
FIG. 11 illustrates the preferred embodiment of the present invention.

Referring to FIG. 11, the preferred embodiment of the present invention is illustrated. Here, a plurality of cameras 220, each comprising a field of view, are incorporated for providing sensor coverage over an entire conveyor belt. The number of cameras corresponds with the width of the belt, and be adjusted by incorporating a modular design. In view of the embodiments detailed above, the plurality, except for end cameras 220(*a*) and 220(*o*), each comprise a left, a center and a right region.

Each of the cameras is coupled with an electronic module (not shown) positioned with an electronic housing 230 for independent operation. Attached to housing 230 are both pulsed laser diodes, 240 and 245, as well as fresnel collimators, 250 and 255. Positioned superjacent fresnel collimators 250 is striped binary mask 260 for creating the structured light pattern. Further attached to housing 230 are a pair of beam splitters, 270 and 275. Both splitters translate the light generated by the pulsed diodes onto the object while allowing the plurality of sensors to detect the illumination. It should be obvious to one of ordinary skill in the art that while providing the plurality of sensors with a view of the illuminated object, both splitters 270 and 275 also prevent shadowing of the object.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. While the invention detailed herein is intended for use as an input to a vision system for reading package labels, several other applications should be obvious to one of ordinary skill in the art. These include but are not limited to other devices requiring topographic information. It is therefore contemplated that the appended claims will cover any such modifications or embodiments as fall within the true scope of the invention.

All of the U.S. patents cited herein are hereby incorporated by reference as if set forth in their entirety.

What is claimed is:

1. A system for measuring the height of an object having an outer surface, comprising:

a source, having two or more light sources, including a first light source providing a first light beam having a structured energy pattern for irradiating the outer surface of the object; said structured energy pattern having a constant dimension, and a second light source providing a second light beam for uniformly illuminating the outer surface of the object;

a sensor, for individually sensing the outer surface of the object as irradiated by said first light beam and said second light beam;

a system for removing interference resulting from unwanted markings on the surface of the object by dividing said first light beam sensed by said sensor with said second light beam sensed by said sensor; and a system for calculating the height of the object in response to said constant dimension of said structured pattern irradiating said outer surface of the object and sensed by said sensor.

2. The system for measuring the height of an object of claim 1, wherein said structured pattern of said first light beam comprises a light pattern having a number of stripes.

3. The system for measuring the height of an object of claim 2, wherein said source comprises:

a first laser diode for generating said first light beam, and a second laser diode for generating said second light beam;

a focusing lens for generating a focused first light beam;

a collimating lens for generating a collimated focused first light beam; and a striped binary mask for creating said structured light pattern from said collimated focused first light beam.

4. The system for measuring the height of an object of claim 1, wherein said constant dimension comprises a periodicity, and said system for performing a spatial transform comprises:

a system for measuring said periodicity of said constant dimension of said structured pattern irradiating said outer surface of the object and sensed by said sensor.

5. The system for measuring the height of an object of claim 1, wherein said system for performing a spatial transform comprises:

a system for performing at least one of a Fast Fourier Transform ("FFT"), a Walsh Transform, and a Hadamard Transform.

6. A system for measuring the height and profile of an object having an outer surface, comprising:

a source, having two or more light sources, including a first light source providing a first light beam having a structured energy pattern for irradiating the outer surface of the object; said structured energy pattern having a constant dimension, and a second light source providing a second light beam for uniformly illuminating the outer surface of the object;

a sensor, for individually sensing the outer surface of the object as irradiated by said first light beam and said second light beam; said sensor including a first, a second and a third camera system for viewing the object, each said camera having a field of view, said field of views of said second and said third camera overlapping opposite extremes of said field of view of said first camera, such that said first camera field of view comprises a left, a center and a right region;

a system for removing interference resulting from unwanted markings on the surface of the object by dividing said first light beam sensed by said sensor with said second light beam sensed by said sensor; and a system for performing a spatial transform on said structured pattern energy beam sensed by said sensor in said left, said center, and said right regions of said first camera field of view, thereby calculating the height of the object.

7. The system for measuring the height and profile of an object of claim 6, wherein said system for calculating the height of the object comprises:

a system for inputting said spatial transform for said left region, said center region, and said right region;

a system for locating a peak from each of said spatial transform inputted such that a discrete peak location and a size is determined for each of said spatial transform inputted; and a system for deriving a peak ratio and an edge estimate of the object in response to said discrete peak location and said size for each spatial transform inputted such that a height profile of the object is calculated for said field of view, and said left, said center, and said right regions.

8. The system for measuring the height and profile of an object of claim 7, wherein said system comprises:

a calculator for calculating an average height profile from the height profiles of said left, center, and right regions, and said field of view of said first camera system;

uniformly illuminated by said light beam;

said sensor further sensing the intensity of said light beam illuminating the outer surface of the object;

a system for enabling said first light source while disabling said second light source, and for enabling said second light source while disabling said first light source; and a system for determining intensity profiles of the object from said field of view of said first camera, said left, said center, and said right region in response to the intensity of said light beam illuminating the outer surface of the object as sensed by said sensor.

9. The system for measuring the height and profile of an object of claim 8, wherein said system for determining the intensity profile of the object comprises:

a system for subtracting the light intensity profile of at least one of said left region and said right region from the light intensity profile of said field of view of said first camera system such that an overall differential intensity profile is created;

a system for locating an edge of the object in response to said overall differential intensity profile such that an edge location is found from said overall differential intensity profile; and a system for combining redundant edge location data from said overall differential intensity profile and edge data from said light intensity profile of said at least one of said left region and said right region such that combined redundant edge data is created.

10. The system for measuring the height and profile of an object of claim 9, further comprising:

a system for quantizing a group of coordinated transformed light intensity profiles and a group of coordinated height profiles such that a group of quantized coordinated light intensity profiles and a group of quantized coordinated height profiles are created, wherein:

said system for calculating an average height profile comprises said system for scaling the height profiles of said field of view and said left, said center, and said right regions such that a coordinated height profile is created for each of said height profiles; and said system for subtracting from the light intensity profile comprises a system for scaling the light intensity profiles of said field of view, and said left, center, and right regions such that a coordinated light intensity profile is created for each of said light intensity profiles.

11. The system for measuring the height and profile of an object of claim 9, further comprising a system for deriving a refined overall height profile for the object in response to said average height profile and said combined redundant edge data.

12. A system for developing a profile of an object having an upper outer surface, a height and an edge, said system comprising:

a first light source for generating a first light beam having a structured light pattern, said structured light pattern having a constant dimension, the outer surface of the object illuminated by said structured light pattern;

a second light source for generating a second light beam having an intensity, the outer surface of the object uniformly illuminated by said second light beam;

a system for enabling said first light source while disabling said second light source, and for enabling said second light source while disabling said first light source;

a sensor for sensing the outer surface illuminated by said first light beam structured light pattern, and for sensing the outer surface illuminated by said second light beam, said sensor comprising a first, a second, and a third camera system, each of said camera systems comprising a field of view, said field of view of said first camera system comprising a left, a center, and a right region, said left region falling within said second camera system's field of view and said right region falling within said third camera system's field of view; and a computer for developing a profile of the object comprising:

a system for performing a spatial transform on said structured light pattern illuminating the outer surface of the object sensed by said sensor and falling within said field of view of said first camera system, and said left, said center and said right regions;

a system for calculating the height of the object in response to said spatial transforms for said left, said center and said right regions of said first camera field of view by determining a discrete peak location for each of said transform and calculating a peak ratio and an edge of the object in response to said discrete peak location, to provide a height profile of the object in said left, center, and right regions of said first camera field of view; said system further calculating average redundant height value therefrom; and a system for locating the edge of the object in response to the outer surface of the object illuminated by said second light source.

13. The system for developing a profile of an object of claim 12, wherein said system for locating the edge of the object comprises:

a system for determining intensity profiles of the object from said second light beam illuminating the outer surface of the object falling within said field of view of said first camera system, said left, said center, and said right regions, said system for determining intensity profiles comprising:

a system for subtracting from the light intensity profile of said perspective of said first camera system the light intensity profile of at least one of said left overlap area and said right overlap area such that an overall differential intensity profile is created;

a system for locating an edge of the object in response to said overall differential intensity profile such that an edge location is found for overall differential intensity profile; and a system for combining redundant edge location data from said overall differential intensity profile and edge data from said light intensity profile of said at least one of said left overlap area and said right overlap area such that combined redundant edge data is created.

14. The system for developing a profile of an object of claim 12, wherein said constant dimension comprises a periodicity, and said system for performing a spatial transform comprises a system for measuring said periodicity of said constant dimension of said structured pattern irradiating said outer surface of the object.

15. The system for developing a profile of an object of claim 12, wherein said system for performing a spatial transform comprises at least one of a Fast Fourier Transform ("FFT"), a Walsh Transform, and a Hadamard Transform.

16. A method of developing a profile of an object having an outer surface, a height and an edge, said method comprising the steps of:

irradiating the outer surface of the object with a first light beam having a structured light pattern and a constant dimension;

sensing the outer surface of the object illuminated by said structured light pattern falling within a field of view of a sensor, said field of view having a left, a center, and a right region;

performing a spatial transform on said structured light pattern sensed within said field of view, and said left, center, and right regions;

calculating the height of the object in response to the spatial transforms performed on said structured light pattern sensed within said field of view, and said left, center, and right regions such that a height profile is created for said field of view, and said left, center, and right regions, and calculating an average height profile therefrom;

illuminating the outer surface of the object with a second light beam falling within said field of view of said sensor such that a light intensity profile is created for said field of view, and said left, center, and right regions;

locating the edge of the object in response to the light intensity profile of the outer surface of the object illuminated by said second light beam and sensed by said sensor;

subtracting from the light intensity profile of said field of view the light intensity profile of at least one of said left region and said right region such that a differential light intensity profile is created; and combining redundant edge location data from said differential light intensity profile and edge data from said light intensity profile of said at least one of said left region and said right region such that combined redundant edge data is created.

17. The method of developing a profile of an object of claim 16, further comprising the step of:

deriving a refined overall height profile for the object in response to both said average height profile and said combined redundant edge data.

18. The method of developing a profile of an object of claim 16, further comprising the step of:

quantizing a group of coordinated transformed light intensity profiles and a group of coordinated height profiles such that a group of quantized coordinated light intensity profiles and a group of quantized coordinated height profiles are created, wherein:

said step of subtracting from the light intensity profile comprises the step of scaling the light intensity profiles of said field of view, and said left, center, and right regions such that a coordinated light intensity profile is created for each of said light intensity profiles; and said step of calculating an average height profile comprises the step of scaling the height profiles of said field of view, and said left, center, and right regions such that a coordinated intensity profile is created for each of said height profiles.

19. The method of developing a profile of an object of claim 16, wherein said step of performing a spatial transform comprises the step of;

measuring a periodicity of said constant dimension of said structured pattern irradiating said outer surface of the object and sensed by said sensor.

20. The method of developing a profile of an object of claim 16, wherein said step of performing a spatial transform comprises at least one of performing a Fast Fourier Transform ("FFT"), performing a Walsh Transform, and performing a Hadamard Transform.

* * * * *